INVENTORS
ROBIN DEVENISH ALLUM
RONALD FRANK ROUS
CECIL JOHN MAURER
BY Kemon, Kemon & Ottinger
ATTORNEYS INVENTORS
ROBIN DEVENISH ALLUM
RONALD FRANK KOUS
CECIL JOHN MAUREK
BY Kinchelow, Kinchelow & Ollinger
ATTORNEYS July 7, 1970 R. D. ALLUM ET AL 3,519,755

AUTOMATIC SWITCHING ARRANGEMENT FOR TELEPHONE EXCHANGES PROVIDING REROUTING FACILITY

Filed March 28, 1967

6 Sheets-Sheet 3

INVENTORS
Robin Devenish Allum
Ronald Frank Kous
Cecil John Maurer
BY Kinkade, Kinkade & Ottinger INVENTORS
ROBIN DEVENISH ALLUM
RONALD FRANK ROUS
CECIL JOHN MAURER
BY Kinckley, Kinckley & Ottinger
ATTORNEYS INVENTORS
ROBIN DEVENISH ALLUM
RONALD FRANK ROUS
CECIL JOHN MAURER
BY
Kinchlow, Kinchlow & Olleys
ATTORNEYS INVENTORS
ROBIN DEVENISH ALLUM
RONALD FRANK ROUS
CECIL JOHN MAURER
BY Lindenberg, Lindenberg & Ottinger
ATTORNEYS 3,519,755
AUTOMATIC SWITCHING ARRANGEMENT FOR TELEPHONE EXCHANGES PROVIDING REROUTING FACILITY Robin Devenish Allum, Leamington Spa, Ronald Frank Rous, Kenilworth, and Cecil John Maurer, Brentwood, England, assignors to The General Electric Company Limited, London, England, a British company, and Her Majesty's Postmaster General, of The General Post Office, London, England Filed Mar. 28, 1967, Ser. No. 626,467
Claims priority, application Great Britain, Mar. 28, 1966, 13,495/66
Int. Cl. H04q 3/10
U.S. Cl. 179—18 13 Claims

ABSTRACT OF THE DISCLOSURE

An automatic switching arrangement (e.g. in a telephone exchange) for establishing connection between any one of the input paths of the arrangement and a selected one of any designated small group of the output paths of the arrangement (e.g. a P.B.X group), wherein, when no route is available through the switching arrangement to a selected output path, a further output path is selected from the designated group.

This invention relates to automatic switching arrangements.

The invention relates particularly to automatic switching arrangements of the kind comprising: a selective switching network for providing connections between a plurality of input paths and a plurality of output paths of the switching arrangement over routes that are selected for these connections; output path selecting equipment which is arranged to select from any relatively small plurality of the output paths that are designated, during operation, by electric signals supplied to any particular one of the input paths, one output path that is in a predetermined condition; route selecting equipment which is arranged to select any route through said switching network that is available for the connection of said particular input path to an output path selected by said output path selecting equipment, and means for setting up a connection between said particular input path and an output path selected by said output path selecting equipment over an available route selected by the route selecting equipment.

In one particular application of such a switching arrangement, the switching arrangement forms part of an automatic telephone exchange having a plurality of output paths which are connected to telephone equipments served by the exchange, the telephone equipments including at least one private branch exchange which is connected to a said small plurality of the output paths. In response to electrical signals which are supplied via any particular one of a plurality of input paths of the exchange, and which designate the output paths associated with a private branch exchange, the switching arrangement makes connection, via any route through said selective switching network which is available, between that particular input path and one of the output paths associated with that private branch exchange which is in a free condition.

In known forms of switching arrangement of the kind specified, if the route selecting equipment is unable to find an available path through the switching network between any particular input path and the output path selected by the output path selecting equipment, the switching arrangement fails to establish a connection between that input path and any of the designated small plurality of output paths.

It is an object of the present invention to provide a switching arrangement of the kind specified which is improved in this respect.

According to the present invention, a switching arrangement of the kind specified further includes: re-selection means which when no route is available through said selective switching network between a said particular input path and an output path selected by said output path selecting equipment, causes said output path selecting equipment to select from said designated small plurality of output paths, a further output path which is in said predetermined condition.

The output path selecting equipment suitably comprises: circuit means which is adapted for connection simultaneously to any small plurality of the output paths and which is arranged to select from the output paths that are simultaneously connected thereto at any time, one output path which is in said predetermined condition; and connecting means arranged to connect said circuit means simultaneously to any one or more of the output paths that are designated by electric signals supplied by any particular input path.

The said circuit means may include interrogating means which is arranged to indicate simultaneously the condition of each output path that is connected to said circuit means at any time during operation, and selecting means which is arranged to select from any of the output paths that are connected to said circuit means, one output path which is indicated as being in said predetermined condition by said interrogating means.

The connecting means may comprise a plurality of connecting devices, for example, electromagnetic relays, each of which is associated with a different one of the output paths and is arranged to connect its associated output path to said circuit means upon the supply to that connecting device of a predetermined marking signal.

The said re-selection means may be arranged only to cause the output path selecting equipment to select a second output path from any small plurality that is designated as aforesaid, during operation, when no route is selected to an initially selected output path of that small plurality, not more than two selections of output paths being made by the output path selecting means from each small plurality that is designated during operation. In other words, only two attempts are made to find an available route between any input path and the small plurality of output paths designated by signals supplied to an input path.

According to a feature of the present invention, a telephone exchange includes an automatic switching arrangement having a plurality of input paths; a plurality of output paths which are connected to telephone equipments served by the exchange, at least one telephone equipment, comprising a private branch exchange which is connected to a small plurality of said output paths; a selective switching network for extending telephone connections from these input paths to these output paths over routes that are selected for these connections; output path selecting means which is arranged, when a private branch exchange is designated by electric signals supplied to any particular one of the input paths, to select a free output path from the small plurality of output paths connected to that private branch exchange; route selecting equipment which is arranged to select any route through said switching network that is available for the connection of said particular one of the input paths to an output path selected by said output path selection equipment; means for setting up a connection between said particular input path and an output path selected by said output path selecting equipment over an available route selected by the route selecting equipment and re-selection means which, when no route is available through said selective switching network between said particular input path and an output path selected by the output path selecting equipment causes said output path selecting equipment to select a further free output path from the output paths connected to that private branch exchange.

A final selector switching stage of an automatic telephone exchange which incorporates an automatic switching arrangement in accordance with the present invention will now be described by way of example with reference to the accompanying drawings in which.

The final selector switching stage is arranged to extend connections selectively and one at a time from a group selector switching stage in the exchange to at least some of the particular subscribers' lines of the exchange that extend to telephone equipments having the same value of thousands digit for their directory numbers in the exchange numbering scheme.

Figure 1:
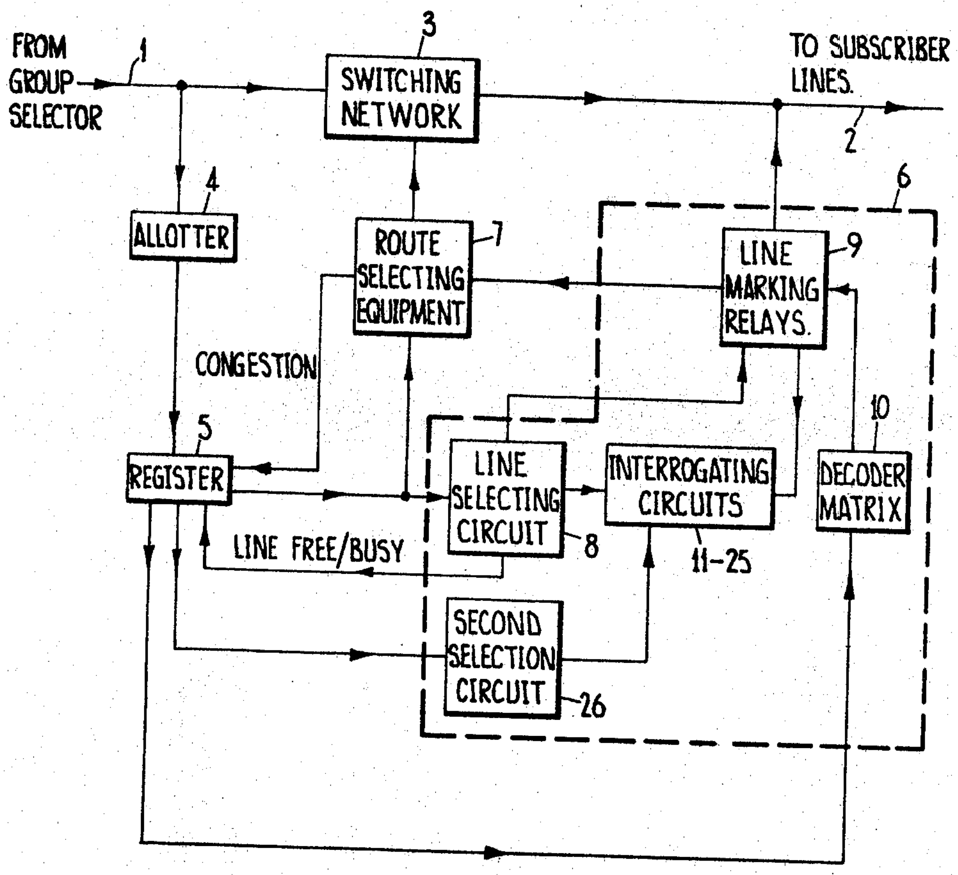
FIG. 1 is a block schematic diagram of the final selector switching stage.

Referring now to FIG. 1, the final selector switching stage has forty-five input paths 1 which are connected to the group selector switching stage (not shown), a relatively large number of output paths 2 which are connected to a corresponding number of the particular subscribers' lines (not shown) via line circuits (not shown) of the exchange, and a selective switching network 3 which is arranged to provide connections automatically between the input paths 1 and the output paths 2 over routes that are selected for these connections and which has sufficient routes for such connections to exist simultaneously from a limited number only of the input paths 1.

The input paths 1 are also connected to an allotter 4 which serves to connect selectively to a register 5, one at a time, any of the input paths 1 that are engaged via the group selector switching stage. Line selecting equipment 6 is provided for selecting any output path 2 that is connected to a telephone equipment which is designated by electric signals supplied to the register 5 over any particular input path 1 and which then is free for connection to this input path 1, and route selecting equipment 7 is provided for selecting any route through the switching network 3 that then is available for the connection of this particular input path 1 to the selected output path 2.

Some of the telephone equipments that are connected to the output paths 2 comprise private branch exchanges (P.B.X's), up to fifteen output paths 2 being connected to each of these P.B.X's. The telephone equipments that are connected to the other output paths 2 comprise the telephone instruments of ordinary subscribers.

The line selecting equipment 6 includes a line selecting circuit 8 which, when any one of the P.B.X's is designated as aforesaid, selects a free one of the output paths 2 associated with that P.B.X. The route selecting equipment 7 is arranged so that if it is unable to select an available route through the switching network 3 to the selected one of the output paths 2 associated with the P.B.X, it initiates via the register 5 the selection by the line selecting circuit 8 of a second free one of these output paths 2. In this way, a substantial reduction is obtained in the number of calls to the P.B.X's that fail due to the absence of available routes through the switching network 3. Hence, the proportion of calls to P.B.X's which fail due to the limited capability of the switching network 3 is small compared with calls to ordinary subscribers, providing a higher grade of service for P.B.X's than ordinary subscribers.

The line selecting equipment 6 also includes a plurality of electromagnetic reed relays 9 (hereinafter referred to as the "line marking relays") each of which is associated with a different one of the output paths 2, and a decoder matrix 10 is connected to the register 5 and controls the operation of the line marking relays 9 according to the electric signals that are supplied to the register 5. Each of the line marking relays 9, when operated, completes a first connection between a private wire of its associated output path 2 and an allocated one of fifteen itnerrogating circuits 11 to 25 incorporated in the line selecting equipment 6, and a second connection between a further wire of its associated output path 2 and a particular one of fifteen output conductors of the line selecting circuit 8 that corresponds to the allocated one of the fifteen interrogating circuits 11 to 25, each of these output conductors corresponding to a different one of the interrogating circuits 11 to 25. The line marking relays 9 which are associated with any one of the P.B.X's are each allocated to a different one of the interrogating circuits 11 to 25.

The interrogating circuits 11 to 25 are arranged to interrogate any one or more of the output path private wires that are connected thereto at any time, and to indicate to the line selecting circuit 8 which if any of these output paths are free, i.e. not in use. In response to this indication, the line selecting circuit 8 is arranged to apply a voltage to the output conductor corresponding to one of any one or more of the interrogating circuits 11 to 25 that are indicating free output paths at any time, and thereby select and mark one of these free output paths.

The line selecting equipment 6 also includes a second selection circuit 26 which is conected to the register 5. On application of a signal from the register 5 at any time when one of the output paths associated with a P.B.X is selected by the line selecting circuit 8, the second selection circuit 26 causes the line selecting circuit 8 to select and mark another free one of the output paths associated with that P.B.X.

During operation, when any one of the input paths 1 is engaged via the group selector switching stage and then is connected to the register 5, the register 5 supplies a "proceed-to-send" signal which is returned via the group selector switching stage to storage means associated with the partially set up connection through the exchange. This storage means stores electrically the values of at least the units, tens and hundreds digits of the directory number for the called subscriber's telephone equipment and also class of service information that indicates whether this telephone equipment is a P.B.X or a telephone instrument. In response to the "proceed-to-send" signal, the storage means sends forward to the register 5 electric signals representing these three digit values and also the class of service information. The register 5 then causes the decoder matrix 10 to effect the operation of one or more line marking relays 9 which are associated with the called subscriber's telephone equipment that is designated by these electric signals.

If this telephone equipment is a telephone instrument only one of the line marking relays 9 is operated as only one of the output paths 2 is involved. This output path 2 is integrated by the interrogating circuits 11 to 25 and, if free, is selected by the line selecting circuit 8. In these circumstances the said line selecting circuit 8 supplies a "line free" signal to the register 5. In selecting this output path the line selecting circuit 8 causes the route selecting equipment 7 to proceed with the selection of any available route through the switching network 3 between the engaged input path 1 that is connected to the register 5 and the selected output path 2. If the register 5 does not receive the said "line free" signal within a predetermined interval of time it causes the supply of a "busy tone" signal to the calling subscriber's telephone equipment.

When the route selecting equipment 7 selects an available route the required connection is set up automatically over this route by the switching network 3. If the route selecting equipment 3 is unable to select any route through the switching network it supplies a "congestion" signal to the said register 5. As the class of service information stored by the register 5 indicates that the called subscriber is served by a telephone instrument a "plant busy" signal is supplied to the calling subscriber's telephone instrument. In either case the register 5 then causes the decoder matrix 10 to release the operated line marking relay 9 and causes the allotter 4 to re-allocate the register 5 to any other one of the input paths 1 which has been engaged as aforesaid.

If the called subscriber's telephone equipment is a P.B.X a plurality of the line marking relays 9 are operated The corresponding plurality of the output paths 2 are interrogated by the interrogating circuits 11 to 25 and a free one of these output paths 2 is selected by the line selecting circuit 8. The subsequent operations are similar to those for the case considered above. However, the class of service information stored by the register 5 indicates that the called subscriber's telephone equipment is a P.B.X. Therefore, if the "congestion" signal is received by the register 5 from the route selection equipment 7, the register 5 initiates a second attempt to establish a connection to this P.B.X by application of a signal to the second selection circuit 26. Thus another free output path 2 associated with this P.B.X is selected by the line selecting circuit 8 and the route selecting equipment 7 attempts to select an available route through the switching network 3 to this output path 2. If the '"congestion" signal again is obtained, the "plant busy" signal is supplied to the calling subscriber's telephone equipment, all the operated line marking relays 9 are released and the register 5 is re-allocated for another call.

Figure 2:
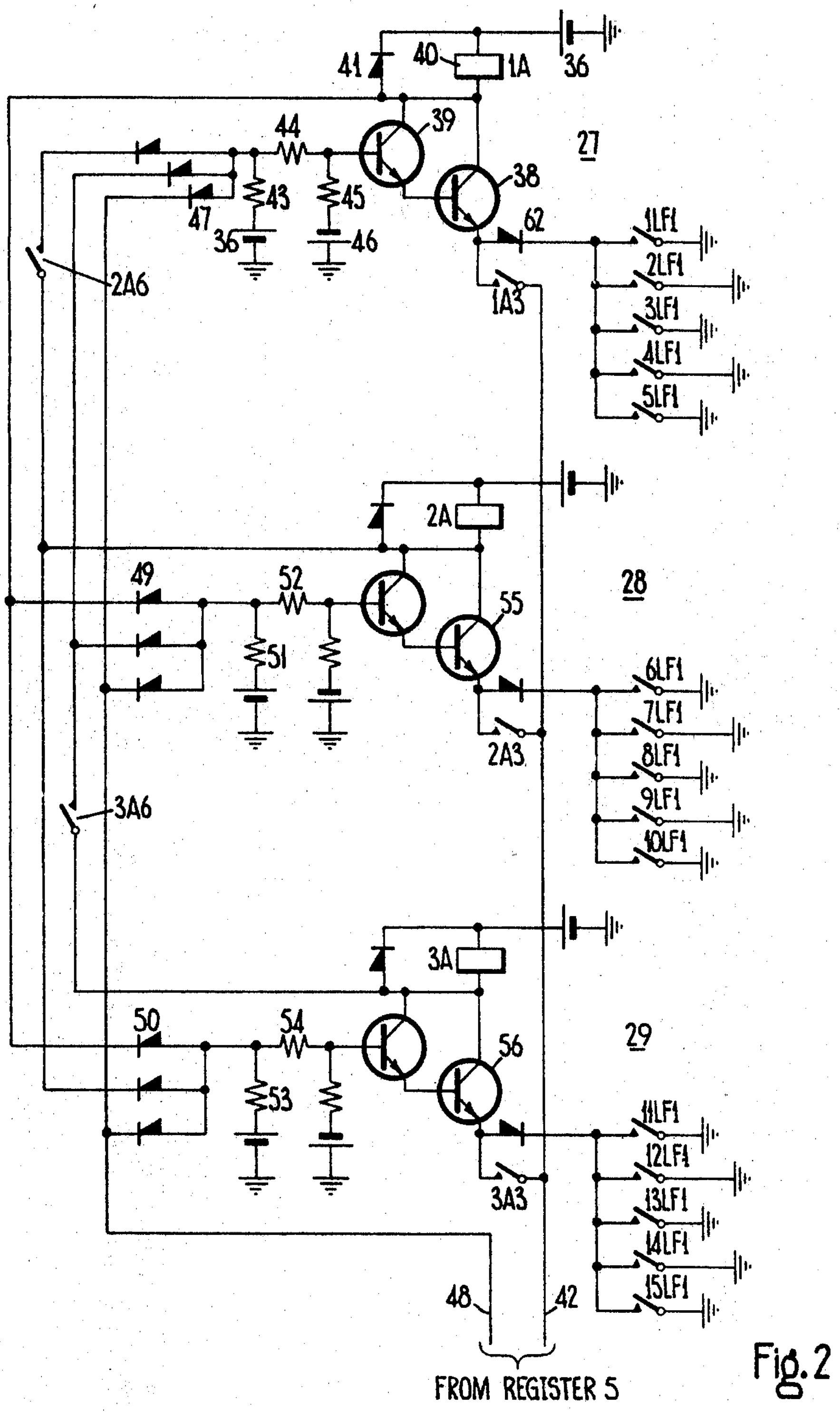
FIGS. 2 to 11 are circuit diagrams of parts of the final selector switching stage.
Figure 3:
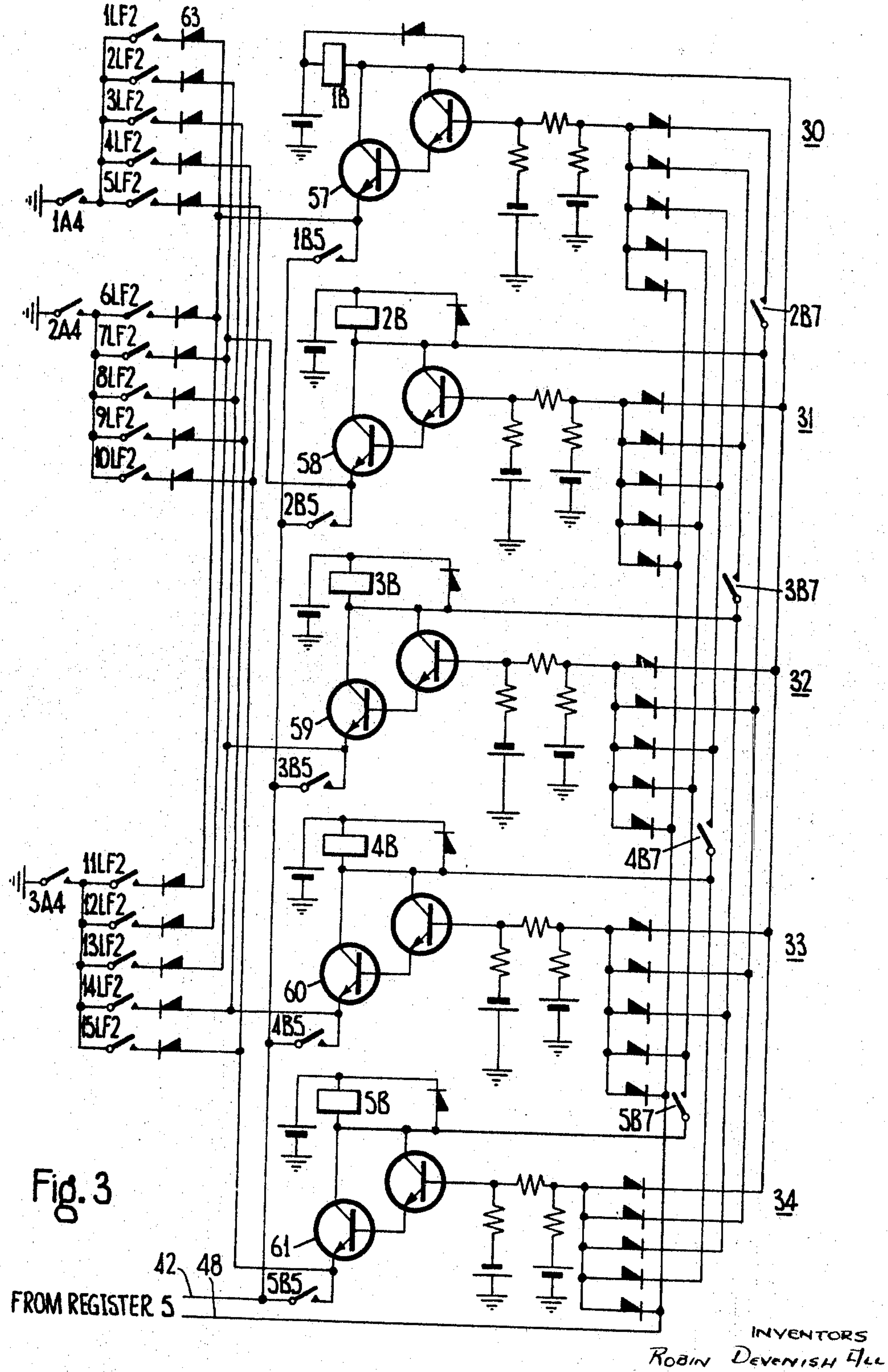

Referring now to FIGS. 2 and 3, in one form the line selecting circuit 8 includes two control networks of which a first control network (see FIG. 2) has three input circuits 27, 28 and 29 that each includes a different one of three electromagnetic reed relays which are hereinafter identified as the relays 1A, 2A and 3A respectively. The second control network (see FIG. 3) has five input circuits 30, 31, 32, 33 and 34 that each includes a different one of five such relays which are hereinafter identified as the relays 1B, 2B, 3B, 4B and 5B respectively.

Figure 4:
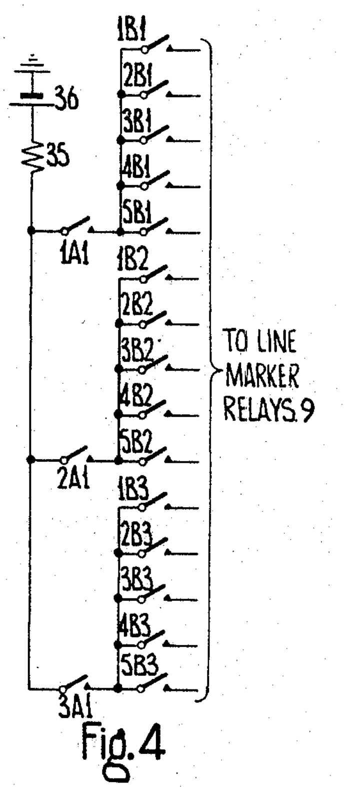

Referring now to FIG. 4, the line selecting circuit 8 also includes a tree of relay contacts comprising three primary branches which include normally open contacts 1A1, 2A1 and 3A1 of the relays 1A, 2A and 3A respectively and which each divides into five secondary branches, the five secondary branches connected to contacts 1A1, 2A1 and 3A1 respectively including normally open contacts 1B1 to 5B1, 1B2 to 5B2 and 1B3 to 5B3 of the relays 1B, 2B, 3B, 4B and 5B respectively. The resulting fifteen secondary branches respectively constitute the fifteen output conductors of the line selecting circuit 8. The primary branches all are connected via a common resistor 35 to the positive terminal of a 50 volt battery 36 which has its negative terminal earthed. Thus it is arranged that when any combination of one of the relays 1A to 3A and one of the relays 1B to 5B is operated one of the output conductors, and hence an output path 2 connected thereto by a line marking relay 9, is selected by being connected to the battery 36. Each of the output conductors thus is associated with a different one of the fifteen such combinations of the relays 1A to 3A and 1B to 5B.

Figure 5:
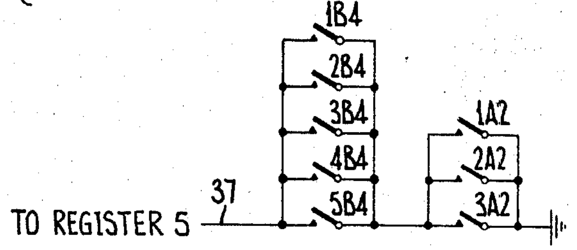

Referring now to FIG. 5, to supply a line free signal to the register 5 when the line selecting circuit 8 has selected an output conductor, parallel connected normally open contacts 1A2, 2A2 and 3A2 of the relays 1A, 2A and 3A are connected in series with parallel connected normally open contacts 1B4 to 5B4 of the relays 1B to 5B between earth and a conductor 37 connected to the register 5. The conductor 37 is thus earthed when any combination of one of the relays 1A to 3A and one of the relays 1B to 5B is operated.

Referring again to FIG. 2, the three input circuits 27, 28 and 29 of the first control network are largely identical so that only one circuit 27 will be described in detail. The control circuit 27 incorporates two NPN transistors 38 and 39 whose collectors are connected via the energizing coil 40 of the relay 1A to the positive terminal of the battery 36, the coil 40 being connected in parallel with a diode 41. The emitter of the transistor 38 is connected via a normally open contact 1A3 of the relay 1A to a conductor 42 connected to the register 5. The base of the transistor 38 is connected to the emitter of the transistor 39. The base of the transistor 39 is biased from a resistor chain comprising three resistors 43, 44 and 45 connected in series, in the order stated, between the positive terminal of the battery 36 and the negative terminal of a 50 volt battery 46 whose positive terminal is earthed. The junction between the resistors 44 and 45 is connected to the base or the transistor 39 and the junction between the resistors 43 and 44 is connected to the anode ol a diode 47 whose cathode is connected to a conductor 48 connected to the register 5. The collectors of the transistors 38 and 39 are also connected to the cathodes of two diodes 49 and 50, the anode of the diode 49 being connected to the junction between two resistors 51 and 52 in the input circuit 28 which correspond respectively to the resistors 43 and 44 in the input circuit 27, and the anode of the diode 50 being connected to the junction between two resistors 53 and 54 in the input circuit 29 which correspond to the resistors 43 and 44 in the input circuit 27.

The input circuits 28 and 29 are similarly interconnected with each of the other two input circuits, but in the case of the input circuit 28, the connection to the input circuit 27 is made via a normally open pair of contacts 2A6 of the relay 2A, and in the case of the input circuit 29 connection to both the other control circuits 27 and 28 is made via a normally open pair of contacts 3A6 of the relay 3A.

Referring now to FIG. 3, the five input circuits 30 to 34 of the second control network are substantially identical to the input circuits 27 to 29, and will not therefore be described in detail.

Interconnections are provided between the input circuits 30 to 34 corresponding to the interconnections between the input circuits 27 to 29, each of the circuits 30 to 34 being directly connected to each of the senior circuits (that is, those appearing above it in FIG. 3) and being connected via a normally open pair of contacts 2B7, 3B7, 4B7, or 5B7 of the associated relay 2B, 3B, 4B or 5B to each of the junior circuits (that is, those appearing beneath it in FIG. 3).

In operation of the input circuits 27 to 34, an inhibiting voltage applied to the conductor 48 from the register 5 is removed. In addition, in a manner to be described below, an earth is applied to one or more of the emitters of the transistor 38 and the corresponding transistors 55 and 56 in the control circuits 28 and 29, and to one or more of the emitters of the corresponding transistors 57 to 61 in the control circuits 30 to 34. As a result the transistors in at least one of the control circuits 27 to 29 of the first control network start to conduct. Due to the interconnections between the control circuits 27 to 29, when the transistors in any one of the control circuits 27 to 29 start to conduct, the transistors in any junior control circuit are immediately prevented from conducting while the transistors in any senior control circuit are only prevented from conducting a short time later, when the associated realy 2A or 3A operates, closing contacts 2A6 or 3A6. Consequently, when earths are applied to more than one of the control circuits 27 to 29, only the relay 1A, 2A or 3A in the most senior one of the control circuits 27 to 29 to which an earth is applied operates. Similarly, only the relay 1B, 2B, 3B, 4B or 5B in the most senior one of the control circuits 30 to 34 to which an earth is applied operates. Hence, in operation of the control circuits 27 to 34 only one combination of one of the relays 1A to 3A and one of the relays 1B to 5B is operated and a voltage is applied via the resistor 35 to only one of the output conductors of the line selecting circuit 8. When operated, the relays 1A to 3A and 1B to 5B are held by a voltage applied to the conductor 42. It is further arranged, as will be explained below, that none of the relays 1B to 5B can operate until one of the relays 1A to 3A has operated.

The interrogating circuits 11 to 25 are each associated with a different one of the combinations of the relays 1A to 3A and 1B to 5B, and each controls the earthing of the emitters of transistors in the particular input circuits 27 to 34 that correspond to the associated relay combinations. The interrogating circuits 11 to 25 are identical so that only one interrogating circuit 11 will be described in detail.

Figure 6:
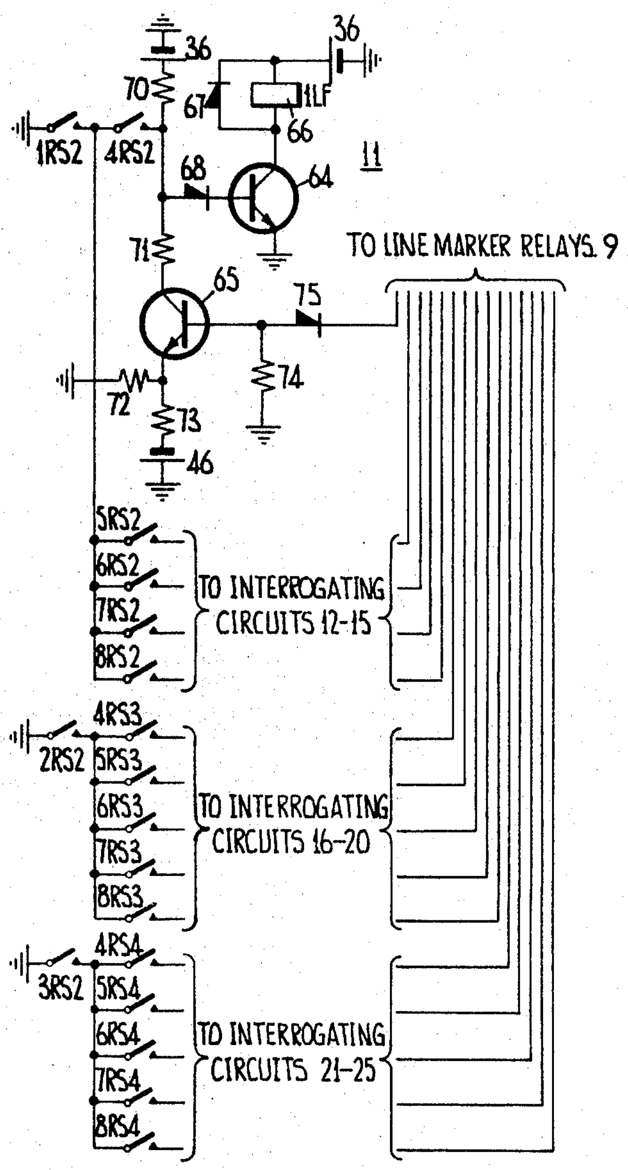

Referring now to FIG. 6, the interrogating circuit 11 is associated with the relays 1A and 1B and includes an electromagnetic reed relay 1LF which is arranged to operate upon the connection of the interrogating circuit 11, via a line marking relay 9 allocated to the interrogating circuit 1, to the private wire of an output path 2 that is free. The relay 1LF, when operated, closes normally open contacts 1LF1 which are connected between earth and the cathode of a diode 62 whose anode is connected to the emitter of the transistor 38 (see FIG. 2) in the associated input circuit 13 and closes normally open contacts 1LF2 which are connected between earth via normally open contacts 1A4 of the relay 1A, and the cathode of a diode 63 whose anode is connected to the emitter of the transistor 57 in the associated input circuit 30.

The other fourteen interrogating circuits 12 to 25 are respectively associated with different combinations of one of the relays 1A to 3A and one of the relays 1B to 5B, and include electromagnetic relays 2LF to 15LF respectively having normally open contacts similarly connected with the input circuits 27 to 34 according to the following schedule.

| Interrogating circuit | Associated with relays | Connected with input circuits | Via contacts |
|---|---|---|---|
| 12 | 1A and 2B | 27 and 31 | 2LF1 and 2LF2 |
| 13 | 1A and 3B | 27 and 32 | 3LF1 and 3LF2 |
| 14 | 1A and 4B | 27 and 33 | 4LF1 and 4LF2 |
| 15 | 1A and 5B | 27 and 34 | 5LF1 and 5LF2 |
| 16 | 2A and 1B | 28 and 30 | 6LF1 and 6LF2 |
| 17 | 2A and 2B | 28 and 31 | 7LF1 and 7LF2 |
| 18 | 2A and 3B | 28 and 32 | 8LF1 and 8LF2 |
| 19 | 2A and 4B | 28 and 33 | 9 LF1 and 9LF2 |
| 20 | 2A and 5B | 28 and 34 | 10LF1 and 10LF2 |
| 21 | 3A and 1B | 29 and 30 | 11LF1 and 11LF2 |
| 22 | 3A and 2B | 29 and 31 | 12LF1 and 12LF2 |
| 23 | 3A and 3B | 29 and 32 | 13LF1 and 13LF2 |
| 24 | 3A and 4B | 29 and 33 | 14LF1 and 14LF2 |
| 25 | 3A and 5B | 29 and 34 | 15LF1 and 15LF2 |

The contacts 2LF2 to 5LF2 are connected to earth via the contacts 1A4 of relay 1A, and the contacts 6LF2 to 10LF2 and 11LF2 to 15LF2 are similarly respectively connected to earth via normally open contacts 2A4 and 3A4 of relays 2A and 3A. The contacts 1A4 to 3A4 prevent the operation of any of the relays 1B to 5B until one of the relays 1A to 3A has operated.

Returning now to FIG. 6, the interrogating circuit 11 also includes two n-p-n type junction transistors 64 and 65 which are subsequently referred to respectively as the "control" transistor and the "inhibit" transistor. The relay 1LF has an energising winding 66 connected in parallel with a diode 67 between the positive terminal of the battery 36 and the collector electrode of the control transistor 64 which has its emitter electrode earthed and its base electrode connected to the cathode of a diode 68 whose anode is connected to a control wire 69. This control wire 69 is connected via a resistor 70 to the positive terminal of the battery 36 and via another resistor 71 to the collector electrode of the inhibit transistor 65 which has its emitter electrode biased from the junction between two resistors 72 and 73 connected in series between earth and the negative terminal of the battery 46. The base electrode of the transistor 65 is connected to earth via a further resistor 74 and is also connected to the anode of a diode 75 whose anode is connected to those line marking relays 9 which are allocated to this interrogating circuit 11.

The inhibit transistor 65 normally is conducting and the control transistor 64 normally is substantially non-conducting so that the relay 1LF is not operated. Upon the connection of the anode of the diode 75, via any allocated line marking relay 9, to the private wire of an output path 2 that is free, the inhibit transistor 65 becomes substantially non-conducting. Consequently the voltage of the control wire 69 rises to a value that is sufficiently positive to earth potential for the control transistor 64 to conduct and the relay 1LF to operate.

It will be understood from the description of the line selection circuit 8 above, that when two or more of the interrogating circuits 11 to 25 are simultaneously connected with the private wires of free output paths, only the combination of one of the relays 1A to 3A and one of the relays 1B to 5B that is associated with the most senior interrogating circuit 11 to 25 connected with a free output path will operate. Hence, only the corresponding output path is selected and marked by the line selecting circuit.

Figure 7:
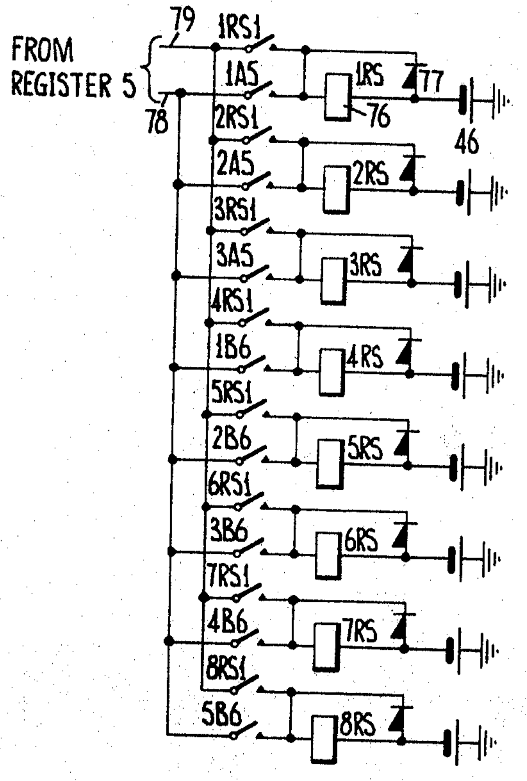

Referring now to FIG. 7, the second selection circuit 26 includes eight electromagnetic reed relays 1RS to 8RS, each of which has an energising winding 76 connected in parallel with a diode 77. Each of the relays 1RS to 8RS has its energising winding 76 connected in series with a respective pair of normally open contacts 1A5 to 3A5 and 1B6 to 5B6 of the relays 1A to 3A and 1B to 5B. The resulting series circuits are connected between a lead 78 from the register 5 and the negative terminal of the battery 46. In addition, normally open contacts 1RS1 to 1RS8 of the relays 1RS to 8RS are respectively connected between the ends of the energising windings 76 of the relays 1RS to 8RS remote from the battery 46 and a lead 79 from the register 5.

Each of the relays 1RS to 8RS is thus associated respectively with a different one of the relays 1A to 3A and 1B to 5B. Consequently each of hte interrogating circuits 11 to 25 is associated with a different combination of one of the relays 1RS to 3RS and one of the relays 4RS to 8RS. Normally open contacts 1RS2 to 3RS2 of the relays 1RS to 3RS are respectively connected in series with normally open contacts 4RS2 to 8RS2, 4RS3 to 8RS3 and 4RS4 to 8RS4 of relays 4RS to 8RS, and the resulting series circuits are respectively connected between the control wires 69 of their associated interrogating circuits 11 to 25 and earth (see FIG. 6).

When the lead 78 is earthed, the two of the relays 1RS to 8RS which are associated with the one of interrogating circuits 11 to 25 which is associated with the operated combination of one of the relays 1A and one of the relays 1B are operated, and the LF relay in that one of the interrogating circuits 11 to 25 is caused to release. The line selecting circuit 8 then selects the output conductor that corresponds to the most senior of the interrogating circuits 11 to 25 in which the LF relay is then operated.

The operated ones of the relays 1RS to 8RS are held by an earth applied via the lead 79, the earth applied to the lead 78 being removed as soon as the relevant ones of the relays 1RS to 8RS have operated to prevent further operation of the second selection circuit 26.

Figure 8:
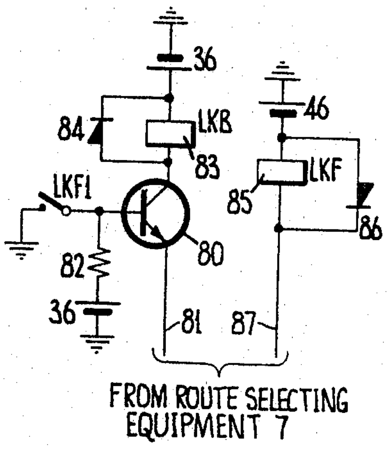

Earthing of leads 78 and 79 is effected in the register 5 as follows. Referring to FIG. 8, the register 5 includes an NPN transistor 80 whose emitter is connected to a lead 81 from the route selecting equipment 7. The base of the transistor 80 is connected via a resistor 82 to the positive terminal of the battery 36, and the collector of the transistor is connected via the energising winding 83 of a relay LKB to the battery 36, a diode 84 being connected in parallel with the winding 83. When no route is available through the switching network 3, the lead 81 is earthed causing relay LKB to operate. When a route is available through the switching network, operation of the relay LKB is prevented by earthing the base of the transistor 80 via normally open contacts LKF1 of a relay LKF. The relay LKF has an energising winding 85 connected in parallel with a diode 86 between the battery 46 and a lead 87 from the route selecting equipment 7 which is earthed when a route is available.

Figure 9:
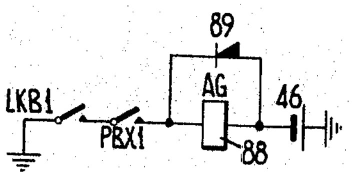

Referring now to FIG. 9, normally open contacts LKB1 of the relay LKB are connected in series with a pair of relay contacts PBX1 which are closed only when the class of service information stored in the register 5 indicates that a called subscriber's telephone equipment is a P.B.X. The series connection of contacts LKB1 and PBX1 is connected in series with the energising winding 88 of a relay AG between earth and the battery 46, a diode 89 being connected in parallel with the winding 88. The relay AG is thus operated only when a call to a P.B.X telephone equipment is being made and no route is available through switching network 3 to the output path selected by the line selecting circuit 8.

Figure 10:
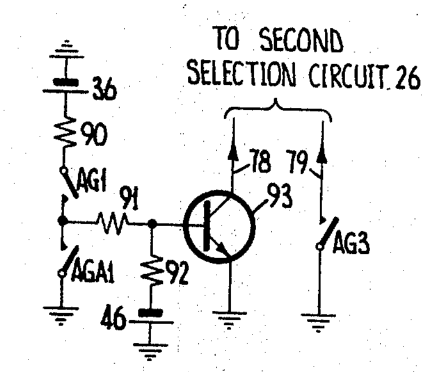
Figure 11:
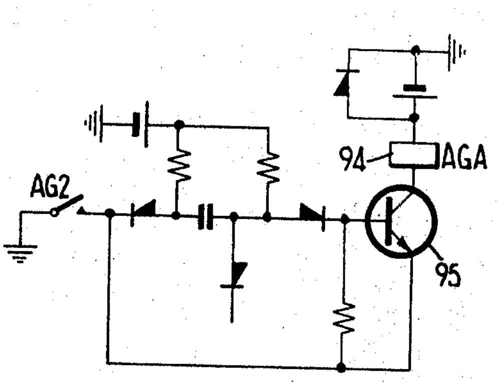

Referring now to FIGS. 10 and 11, the relay AG has a first pair of normally open contacts AG1 connected in series with a pair of normally open contacts AGA1 of a relay AGA between earth and one end of a resistor 90 whose other end is connected to the battery 36. The junction between the contacts AG1 and AGA1 is connected to the battery 46 via two resistors 91 and 92 connected in series, and the junction between the resistors 91 and 92 is connected to the base of an NPN transistor 93 whose emitter is earthed and whose collector is connected to the lead 78. The energising winding 94 of the relay AGA is connected in the collector lead of an NPN transistor 95 which is connected in a delay circuit arrangement so as to start conducting a short time after the closure of a second pair of normally open contacts AG2 of the relay AG. Thus in operation, the lead 78 is earthed via the transistor 93 when a P.B.X call is being handled and no route is available through the switching network 3 for the short period elapsing between the operation of the relay AG and the operation of the relay AGA. To maintain the required earth on the lead 79 until a second attempt to select an available route has been made, a third pair of normally open contacts AG3 of the relay AG is connected between the lead 79 and earth.

A preferred form of the switching network 3 comprises three serially connected ranks of switching assemblies which are of the reed relay crosspoint type. The switching assemblies of these three ranks respectively are hereinafter referred to as "A-switches," "B-switches" and "C-switches." Each switching assembly has a plurality of inlets, a plurality of outlets, each of which can be connected to any one of these inlets, and a plurality of electromagnetic reed relays for connecting these inlets selectively to these outlets. Each said inlet and each said outlet has four wires of which two are for carrying speech signals and of which the other two comprise a private wire and a wire for providing holding circuits for any of the associated relays that are operated. A fifth wire is associated with each of the said inlets and is used for marking any one of the associated relays that is to be operated.

Figure 12:
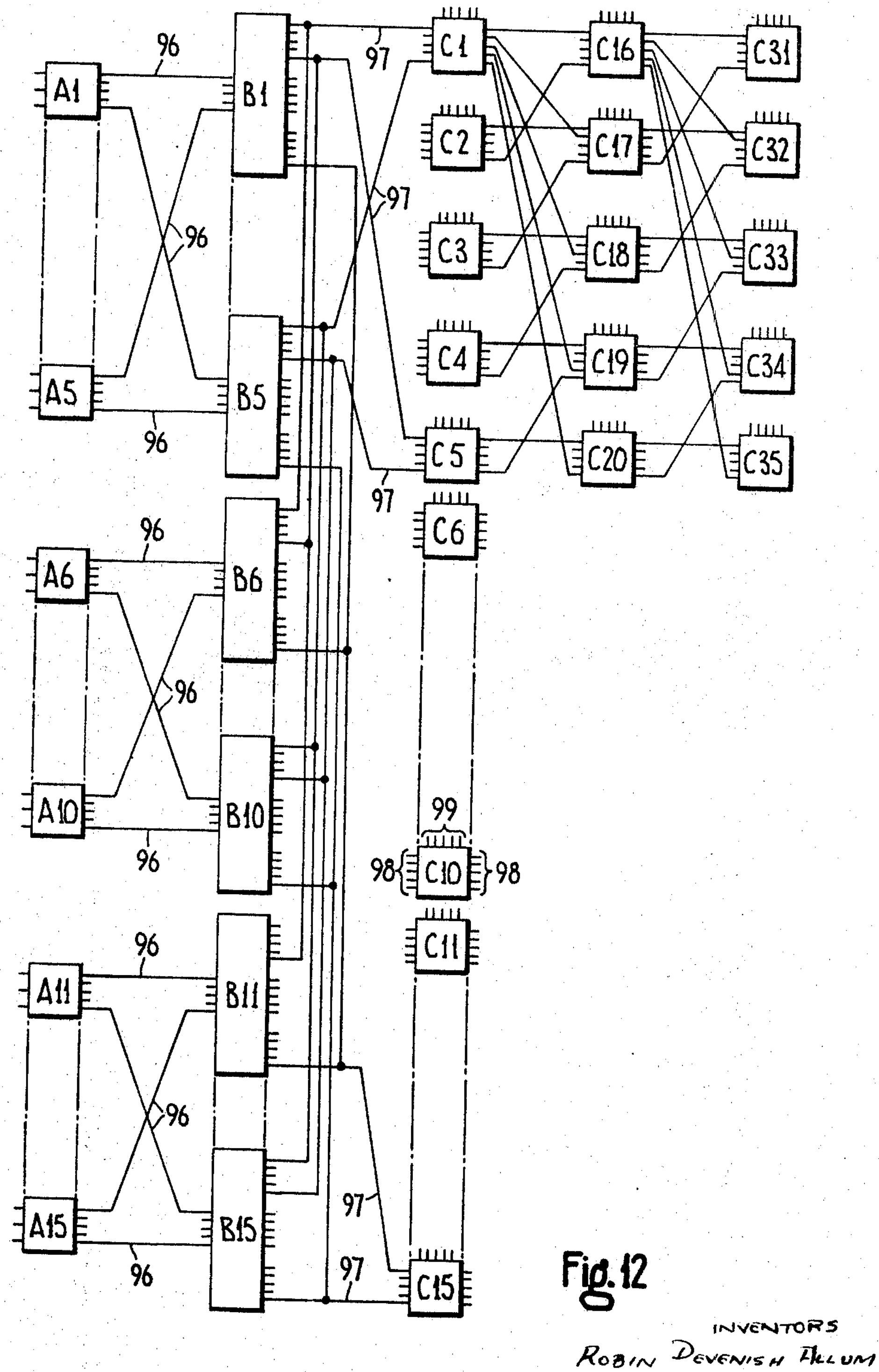
FIG. 12 is a block schematic diagram of a switching network employed in the final selector switching stage.

Referring now to FIG. 12, in the preferred form of the switching network 3 there are fifteen of the said A-switches, each of which has three inlets and five outlets. Each of these inlets is associated with a different one of the forty-five input paths 1. There also are fifteen of the B-switches each of which has five inlets and fifteen outlets. The seventy-five outlets of the rank of A-switches are connected to the seventy-five inlets of the rank of B-switches by seventy-five signalling links 96 respectively which are hereinafter referred to as the "AB links," only some of the AB links 96 being shown in the drawing for the sake of clarity.

The A-switches, the B-switches and the AB links 96 are arranged in three identical groups. Each A-switch of any one of these groups has its five outlets each connected to one inlet of each of the five B-switches of that group. The seventy-five B-switch outlets of each group are multipled to the corresponding outlets of the other two groups and are connected to the inlets of the C-switches over seventy-five signalling links 97 that are hereinafter referred to as the "BC-links."

Each of the C-switches has five inlets 98 and five outlets 99, each of the outlets 99 providing a different one of the output paths 2. In FIG. 12, the outlets 99 of each C-switch are shown at the top and the inlets 98 at the side. Five inlets 98 are shown on each side of each C-switch to simplify illustrating the connections of the C-switches described below. The C-switches are arranged in a matrix of five columns, each column including fifteen C-switches and therefore providing seventy-five of the output paths 2 and seventy-five inlets 98. In FIG. 12, only the first column and parts of the second and third columns are shown for the sake of clarity.

The first five outlets of the five B-switches in each group are connected via twenty-five of the BC-links 97 to the inlets 98 of the first five C-switches in every column, each B-switch being connected to one inlet 98 of each C-switch. For the C-switches in the first column, the connections are straight, that is to say, the first outlet from each B-switch is connected to the first C-switch in the first column, the second outlet from each B-switch is connected to the second C-switch in the first column, and so on. The order in which the B–C links 97 are connected to the first five C-switches in the second column is changed between the first and second column of C-switches, so that the B–C links 97 which went to the first C-switch in the first column, each go to different C-switches in the second column, and so on. The pattern of connections changes in a corresponding manner between each of the other columns of C-switches. The second five outlets and the last five outlets of the five B-switches in any group similarly are connected to the inlets 98 of the second five C-switches and the last five C-switches respectively in every column using the same pattern.

With the form of trunking described above each of the output paths 2 is accessible from one outlet of each of the fifteen B-switches. Also one inlet of each of the five B-switches of any group is accessible from each of the fifteen inlets of the five A-switches of that group. Consequently to find the available routes between any A-switch inlet and any one of the output paths 2 it only is necessary to determine which, if any, of the five B-switches of a single group has free both its particular inlet that is accessible from this A-switch inlet and its particular outlet from which this one of the output paths 2 is accessible.

The finding of available routes for each connection through the switching network 3 is effected in the above manner by means of the route selecting equipment 7 which also selects and marks for operation the particular relay of one A-switch, the particular relay of one B-switch and the particular relay of one C-switch that correspond to any one such route.

We claim:

1. An automatic switching arrangement comprising:
- a plurality of input paths;
- a plurality of output paths;
- a switching network for establishing connections between any one of said input paths and any one of said output paths over a selected route through the network;
- output path selecting equipment for selecting from any relatively small plurality of the output paths that are designated by electric signals supplied to any particular input path, one output path that is in a predetermined condition;
- route selecting equipment for selecting any route through said switching network that is available for the connection of said particular input path to an output path selected by said output path selecting equipment; and
- means for setting up a connection between said particular input path and an output path selected by said output path selecting equipment over an available route selected by the route selecting equipment, wherein the improvement comprises:
- re-selection means which, when no route is available through said switching network between a said particular input path and an output path selected by said output path selecting equipment, causes said output path selecting equipment to select from said designated small plurality of output paths, a further output path which is in said predetermined condition.

2. A switching arrangement according to claim 1 wherein said output path selecting equipment comprises:
- circuit means which is adapted for connection simultaneously to said small plurality of output paths and selects from any said small plurality of output paths which are connected thereto simultaneously one output path which is in said predetermined condition; and
- connecting means for connecting said circuit means simultaneously to the said small plurality of output paths which are designated by electric signals supplied to any particular one of the input paths.

3. A switching arrangement according to claim 2 wherein said circuit means includes interrogating means which indicates simultaneously the condition of each output path that is connected to said circuit means during operation, and selecting means which selects from any of the output paths that are connected to said circuit means at any time during operation, one output path which is indicated as being in said predetermined condition by said interrogating means.

4. A switching arrangement according to claim 3 wherein said circuit means includes a said small plurality of output conductors, said interrogating means includes a said small plurality of interrogating circuits, each of which is associated with a different one of said output conductors, and each of which indicates the condition of a different one of the output paths that are connected to said circuit means in operation, and said selecting means applies a marking signal to a predetermined one of any one or more output conductors whose associated interrogating circuits indicate that the output paths connected therewith are in said predetermined condition.

5. A switching arrangement according to claim 4 wherein said re-selection means includes means which, when no route is available through said selective switching network between a said particular input path and an output path selected by said output path selecting equipment, causes the interrogating circuit associated with that output path effectively to indicate that that output path is not in said predetermined condition.

6. A switching arrangement according to claim 4 wherein said connecting means comprise a plurality of connecting devices each of which is associated with a different one of the output paths and connects its associated output path to said circuit means upon the supply to that connecting device of a predetermined signal.

7. A switching arrangement according to claim 6 wherein each said connecting device connects a first wire of its associated output path to one of said interrogating circuits and a further wire of its associated output path to the said output conductor of the circuit means associated with that interrogating circuit.

8. A switching arrangement according to claim 7 wherein said connecting devices comprise electromagnetic relays.

9. A telephone exchange including an automatic switching arrangement comprising:
- a plurality of input paths;
- a plurality of output paths which are connected to telephone equipments served by the exchange, at least one equipment comprising a private branch exchange which is connected to a small plurality of said output paths;
- a selective switching network for extending telephone connections from any one of said input paths to any one of said output paths over a selected route through said network;
- output path selecting equipment which, when a private branch exchange is designated by electric signals supplied to any particular one of the input paths, selects a free output path from the small plurality of output paths connected to that private branch exchange;
- route selecting equipment for selecting any route through said switching network that is available for the connection of said particular input path to an output path selected by said output path selecting equipment;
- means for setting up a connection between said particular input path and an output path selected by said output path selecting equipment over an available route selected by the route selecting equipment, wherein the improvement comprises:
- re-selection means which, when no route is available through said switching network between a said particular input path and an output path selected by said output path selecting equipment, causes said output path selecting equipment to select a further free output path from the output paths connected to that private branch exchange.

10. A telephone exchange according to claim 9 wherein the output path selecting equipment comprises:
- circuit means which is adapted for connection simultaneously to all the output paths connected to any of said telephone equipments and selects one free output path from the output paths that are simultaneously connected thereto; and
- connecting means for connecting said circuit means selectively to the output paths connected with any one of the telephone equipments which is designated by electric signals supplied to any particular one of the input paths.

11. A telephone exchange according to claim 10 wherein said circuit means comprises:
- a said small plurality of output conductors;;
- a plurality of interrogating circuits each of which is associated with a different one of said output conductors and each of which indicates the condition (free or busy) of a different one of the output paths that are connected simultaneously to said circuit means; and
- selecting means which applies a marking signal to a predetermined one of any of the output conductors whose associated interrogating circuits indicate that the output paths connected therewith are free.

12. A telephone exchange according to claim 11 wherein said connecting means comprise a plurality of connecting devices each of which is associated with a different one of the output paths and connects its associated output path to said circuit means upon the supply of that connecting device of a predetermined signal, each said connecting device connecting a first wire of its associated output path to one of said interrogating circuits and a further wire of its associated output path to the said output conductor of the circuit means associated with that interrogating circuit.

13. A telephone exchange according to claim 11 wherein said re-selection means includes means which, when no route is available through said selective switching network between a said particular input path and an output path selected by said output path selecting equipment, causes the interrogating circuit associated with that output path effectively to indicate that that output path is not free.

References Cited

UNITED STATES PATENTS

| | | |
|---|---|---|
| 2,172,947 | 9/1939 | Taylor et al. |
| 3,283,081 | 11/1966 | Bassett et al. |

WILLIAM C. COOPER, Primary Examiner